US008023717B1

(12) United States Patent
Gudenburr et al.

(10) Patent No.: US 8,023,717 B1
(45) Date of Patent: Sep. 20, 2011

(54) METHOD AND SYSTEM FOR PROCESSING BACKWARDS DOCUMENTS IN A DOCUMENT READER/IMAGER

(75) Inventors: John C Gudenburr, Canton, MI (US); Michael J. Moore, Beverly Hills, MI (US); William L. Kozlowski, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1269 days.

(21) Appl. No.: 11/653,561

(22) Filed: Jan. 16, 2007

(51) Int. Cl.
*G06K 9/46* (2006.01)
*G06K 7/08* (2006.01)

(52) U.S. Cl. ......... 382/139; 382/207; 382/320; 235/449

(58) Field of Classification Search .......... 382/137–139, 382/140, 182, 183, 207, 313, 314, 315, 320, 382/321, 323; 235/379, 436, 449, 450, 485, 235/493, 494; 705/45; 341/1, 6, 15; 360/39, 360/52
See application file for complete search history.

(56) References Cited

U.S. PATENT DOCUMENTS

| | | | | | |
|---|---|---|---|---|---|
| 3,221,303 | A | * | 11/1965 | Bradley | 382/208 |
| 3,246,293 | A | * | 4/1966 | Shelton, Jr. | 382/182 |
| 3,605,092 | A | * | 9/1971 | Richard | 382/208 |
| 3,629,822 | A | * | 12/1971 | Johnson | 382/320 |
| 3,764,978 | A | * | 10/1973 | Tyburski et al. | 382/318 |
| 3,912,909 | A | * | 10/1975 | Harrison | 235/436 |
| 3,949,363 | A | * | 4/1976 | Holm | 382/140 |
| 3,978,450 | A | * | 8/1976 | Sanner et al. | 382/320 |
| 4,143,355 | A | * | 3/1979 | MacIntyre | 382/139 |
| 4,201,978 | A | * | 5/1980 | Nally | 382/140 |
| 4,245,211 | A | * | 1/1981 | Kao | 382/139 |
| 4,399,553 | A | * | 8/1983 | Toyama | 382/139 |
| 4,542,829 | A | * | 9/1985 | Emery et al. | 209/534 |
| 4,547,899 | A | * | 10/1985 | Nally et al. | 382/139 |
| 4,797,938 | A | * | 1/1989 | Will | 382/139 |
| 4,827,531 | A | * | 5/1989 | Milford | 382/207 |
| 4,876,735 | A | * | 10/1989 | Martin et al. | 382/310 |
| 4,968,419 | A | * | 11/1990 | Karalus et al. | 209/539 |
| 5,014,325 | A | * | 5/1991 | Moritomo | 382/135 |
| 5,054,092 | A | * | 10/1991 | LaCaze | 382/139 |
| 5,091,961 | A | * | 2/1992 | Baus, Jr. | 382/139 |
| 5,464,099 | A | * | 11/1995 | Stevens et al. | 209/3.1 |
| 5,540,338 | A | * | 7/1996 | Stevens et al. | 209/534 |
| 5,729,621 | A | * | 3/1998 | Marshall et al. | 382/139 |
| 5,737,440 | A | * | 4/1998 | Kunkler | 382/137 |
| 6,103,985 | A | * | 8/2000 | Shell et al. | 209/587 |
| 6,243,504 | B1 | * | 6/2001 | Kruppa | 382/318 |
| 6,504,946 | B1 | * | 1/2003 | Rossignoli | 382/139 |
| 6,621,920 | B1 | * | 9/2003 | Koike | 382/139 |

(Continued)

*Primary Examiner* — Bhavesh Mehta
*Assistant Examiner* — Anthony Mackowey
(74) *Attorney, Agent, or Firm* — Honigman Miller Schwartz and Cohn LLP

(57) ABSTRACT

A method for processing backwards documents in a document processing system involves a reverse recognition algorithm. The document processing system includes a magnetic ink character recognition (MICR) reader. A waveform is determined for a magnetic ink character string on a document. A forward recognition algorithm is applied to compare the determined waveform to a set of known character profiles. In a case where the magnetic ink character string remains unrecognized after application of the forward recognition algorithm, a reverse recognition algorithm is applied to compare the determined waveform to the set of known character profiles. The reverse recognition algorithm considers the determined waveform as resulting from the document being oriented backwards when passing though the magnetic ink character recognition reader when comparing the waveform to the set of known character profiles.

5 Claims, 8 Drawing Sheets

U.S. PATENT DOCUMENTS

| | | | | |
|---|---|---|---|---|
| 6,654,487 B1* | 11/2003 | Downs, Jr. | | 382/139 |
| 6,659,347 B1* | 12/2003 | Moore et al. | | 235/449 |
| 6,863,214 B2* | 3/2005 | Garner et al. | | 235/379 |
| 6,924,450 B2* | 8/2005 | Maloney | | 209/583 |
| 6,928,183 B2* | 8/2005 | Mitchell et al. | | 382/139 |
| 7,219,831 B2* | 5/2007 | Murata | | 235/379 |
| 7,327,868 B2* | 2/2008 | Perner et al. | | 382/140 |
| 7,474,779 B2* | 1/2009 | Duncan | | 382/137 |
| 7,474,780 B2* | 1/2009 | Volpa | | 382/139 |
| 7,558,418 B2* | 7/2009 | Verma et al. | | 382/137 |
| 7,590,275 B2* | 9/2009 | Clarke et al. | | 382/137 |
| 7,647,275 B2* | 1/2010 | Jones | | 705/40 |
| 7,711,176 B2* | 5/2010 | Rossignoli | | 382/140 |
| 7,735,721 B1* | 6/2010 | Ma et al. | | 235/379 |
| 2001/0045452 A1* | 11/2001 | Momose et al. | | 235/379 |
| 2002/0067846 A1* | 6/2002 | Foley | | 382/139 |
| 2002/0184151 A1* | 12/2002 | Maloney | | 705/45 |
| 2004/0062431 A1* | 4/2004 | O'Neill | | 382/137 |
| 2004/0076320 A1* | 4/2004 | Downs, Jr. | | 382/139 |
| 2004/0130337 A1* | 7/2004 | Clark | | 324/693 |
| 2005/0012967 A1* | 1/2005 | Okamura | | 358/474 |
| 2005/0047641 A1* | 3/2005 | Volpa | | 382/137 |
| 2005/0139671 A1* | 6/2005 | McGlamery et al. | | 235/449 |
| 2005/0178834 A1* | 8/2005 | Natsuno | | 235/449 |
| 2005/0213804 A1* | 9/2005 | Simmons | | 382/137 |
| 2006/0045321 A1* | 3/2006 | Yu | | 382/137 |
| 2006/0045322 A1* | 3/2006 | Clarke et al. | | 382/137 |
| 2006/0110023 A1* | 5/2006 | Goetz et al. | | 382/139 |
| 2006/0182331 A1* | 8/2006 | Gilson et al. | | 382/137 |
| 2006/0182332 A1* | 8/2006 | Weber | | 382/139 |
| 2007/0203715 A1* | 8/2007 | Kane | | 705/1 |
| 2007/0288382 A1* | 12/2007 | Narayanan et al. | | 705/45 |
| 2008/0137939 A1* | 6/2008 | Wang et al. | | 382/139 |

* cited by examiner

Character One  Character Two  Character Three  Character Four

Character Five  Character Six  CharacterSeven  Character Eight

Character Nine  Character Zero  Symbol R-T  Symbol Amount

50

Symbol On-Us  Symbol Dash

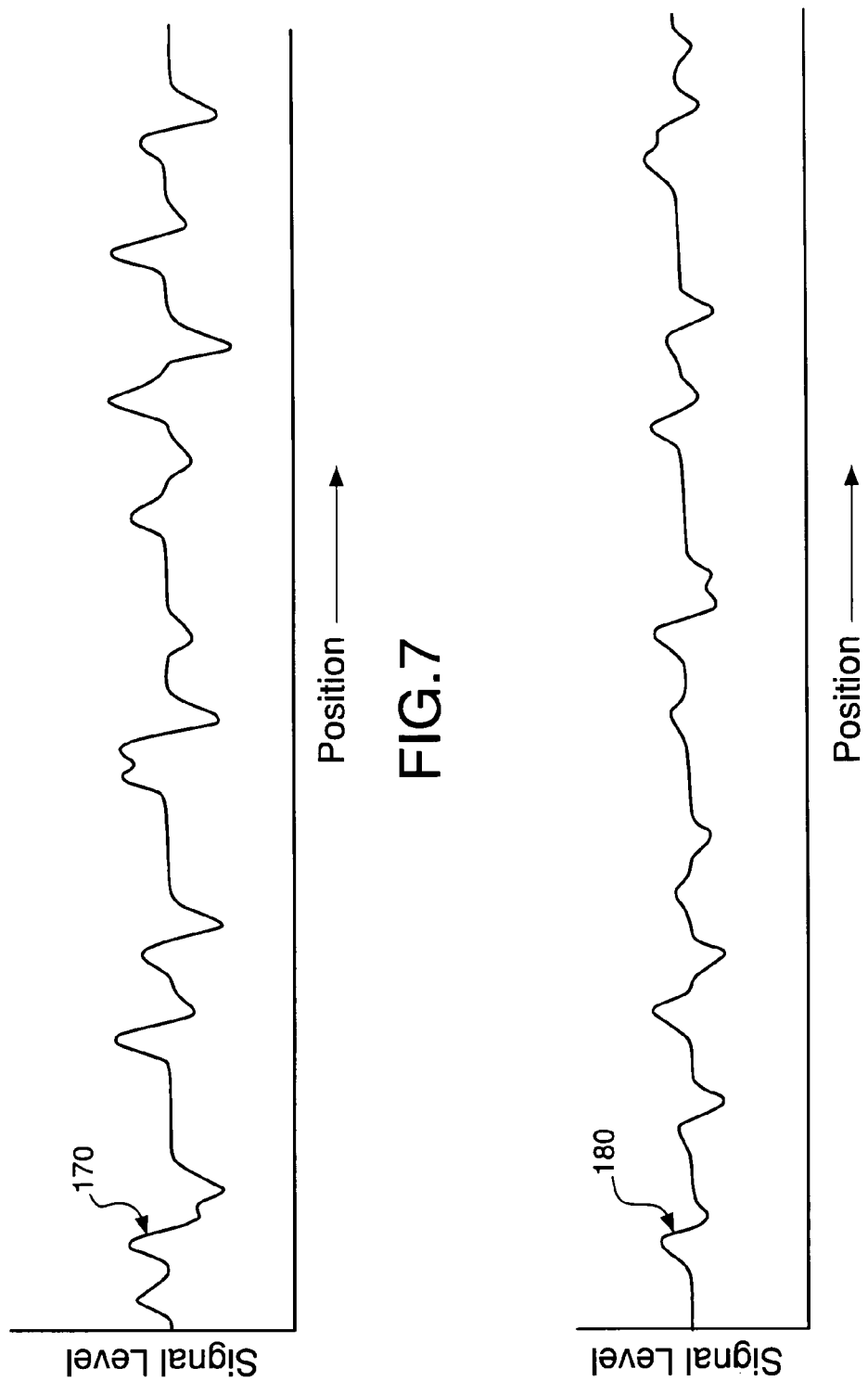

METHOD AND SYSTEM FOR PROCESSING BACKWARDS DOCUMENTS IN A DOCUMENT READER/IMAGER

BACKGROUND OF THE INVENTION

1. Field of the Invention

The invention relates to document processing, and to magnetic ink character recognition. The invention further relates to methods and systems for processing backwards documents in a document reader/imager.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in the ANSI X9.27-2000 "Print and Test Specifications for Magnetic Ink Printing (MICR)" as promulgated by the American National Standards Institute. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In existing document processors, throughput is measured by the number of items processed in a given time. When a stack of documents is loaded into the hopper at the document feeder, it is possible that one or more documents may be oriented backwards. In the case of a document that contains a MICR code line along the bottom edge of the document, inserting the document backwards into the document processor will generate an error in a document processing application where magnetic ink character recognition is used. As a result, the document will have to be processed manually. The MICR code line will have to be entered by hand by referencing the physical document or an image of the document. This manual processing is time consuming and degrades throughput. An improvement in overall throughput can be achieved by reducing the time that the operator spends recovering from a backwards inserted document; however, current recovery procedures require manual processing, which is costly in time and in manpower.

SUMMARY OF INVENTION

It is an object of the invention to provide an improved method and system for processing backwards documents in a document reader/imager that reduces the need for manual processing. The invention comprehends an approach to MICR reading and recognition which involves a "reverse" MICR algorithm.

In accordance with the invention, when a document/item contains a high number of unknown characters as determined by the traditional, that is, "forward" MICR algorithm, the "reverse" MICR algorithm is applied. The "reverse" MICR algorithm compares the MICR signal from the document with patterns that are expected when the document is processed backwards. These patterns include the MICR signal being reversed and inverted, having a lower amplitude, and having lower quality. If the "reverse" MICR algorithm is successful in recognizing each character, then this result can be used confidently for the document. If images are captured, then front and rear images can be swapped.

The advantages associated with embodiments of the invention are numerous. For example, methods and systems of the invention for processing backwards documents may be utilized in document processing systems to reduce the need for manual processing when a loaded stack of documents contains one or more backwards documents. Further, smaller document processing systems that handle smaller numbers of documents or that handle singly fed documents may benefit by utilizing methods and systems of the invention for processing backwards documents.

BRIEF DESCRIPTION OF THE DRAWINGS

FIG. 7 illustrates a waveform for a magnetic ink character data string when the document containing the data is inserted correctly, in the forward direction, into the feeder of the document processor; and FIG. 8 illustrates a waveform for the magnetic ink character data string when the document containing the data is inserted backwards, in the reverse direction, into the feeder of the document processor.

DETAILED DESCRIPTION OF THE PREFERRED EMBODIMENTS

Figure 1:
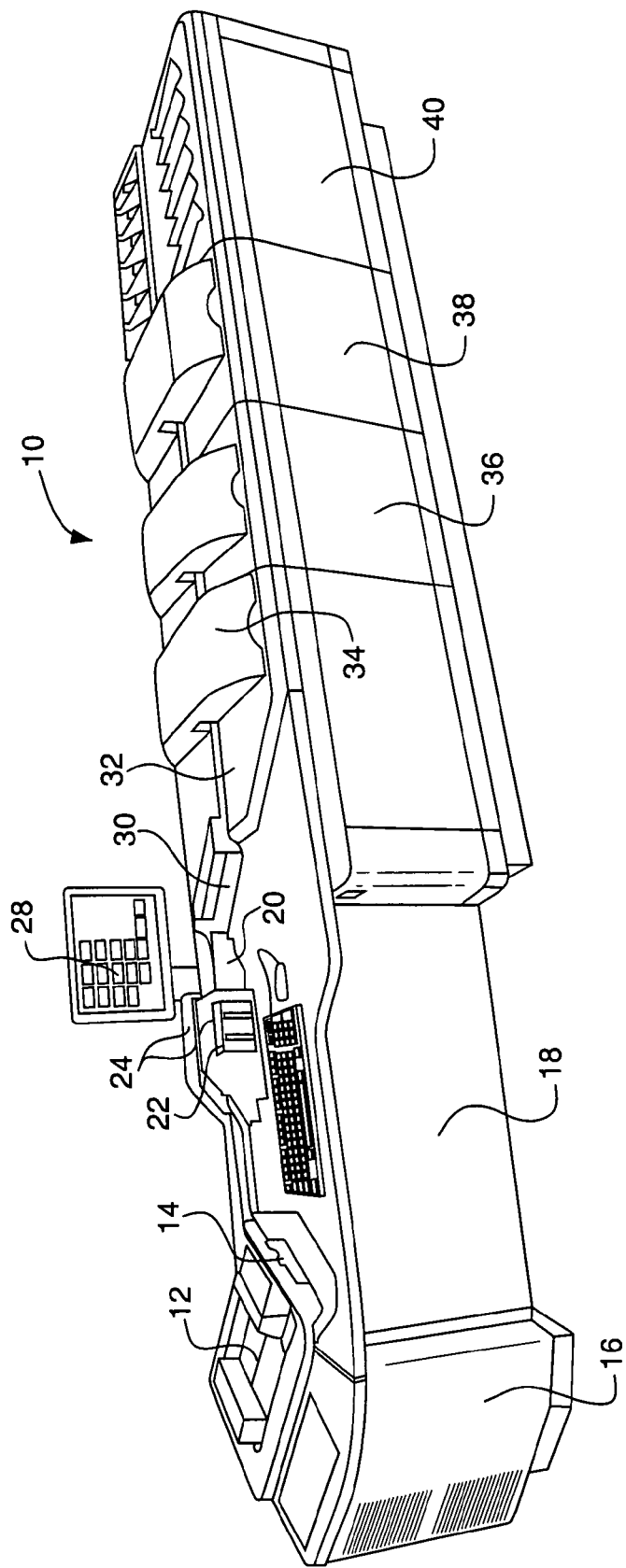
FIG. 1 illustrates a document processing system for feeding and transporting documents.

FIG. 1 illustrates a document processing system for feeding and transporting documents at 10. System 10 includes a primary feeder 12 and a secondary feeder 14. Cabinet 16 houses a computer running software for system 10. System 10 further includes removable kneewell panel 18. The feeders act to separate and feed documents singly, in order, from a stack. The remainder of the system is the transporting portion of the system, which includes a number of roller pairs and/or belts to convey the documents, one at a time, through a track past other processing devices that perform operations on the documents.

As shown in FIG. 1, a number of processing devices are located in the transporting portion of the system 10. Magnetic ink character recognition (MICR) reader 20 and optical character recognition (OCR) reader 22 are located in the document track following secondary feeder 14. As well, upstream imaging devices 24 image each passing document. The operator display is indicated at 28.

With continuing reference to FIG. 1, system 10 further includes a post-read view station 30, and a low-speed document encoder 32. As well, a multi jet endorser (MJE) is located at 34. Further down the document track, an amount-only or full-field high-speed encoder 36 and downstream imager 38 process the passing documents. Finally, a 12-pocket stacker module 40 is provided for the actual sorting of the documents into pockets.

FIG. 1 illustrates an exemplary document processing system. It is appreciated that embodiments of the invention may be employed in a variety of different types of document processing systems including large document processing systems that handle stacks of documents and smaller document processing systems that handle smaller stacks of documents or may even handle single documents, fed one at a time.

Figure 2:
FIG. 2 shows the outline and shape of the fourteen characters and symbols which are called the E-13B MICR character set as used on many financial payment documents.
Figure 2:
Figure 2:
Figure 2:
Figure 2:
Figure 2:
Figure 2:
Figure 2:
Figure 2:
Figure 2:
Figure 2:
Figure 2:
Figure 2:
Figure 2:

FIG. 2 illustrates the E-13B character set at 50. The character set 50 contains ten characters and four symbols as defined in the ANSI X9.27-2000 "Print and Test Specifications for Magnetic Ink Printing (MICR)." When used on a document for automated machine reading, the characters and symbols in the set must be printed using magnetic ink. ANSI X9.27 defines the dimensions of each character/symbol and the expected nominal waveform peak position and relative amplitude of waveform peaks.

Figure 3A:
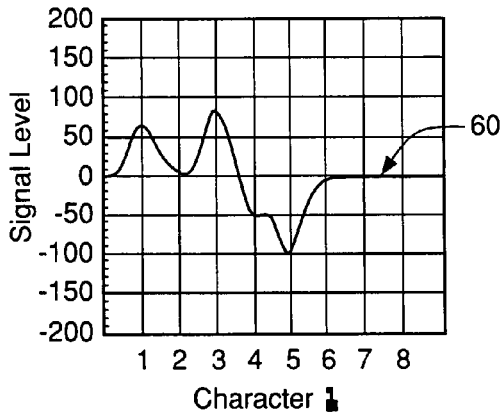
FIGS. 3A-3N show the set of waveforms for the E-13B characters and symbols as read from a responsive magnetic signal gap read head when the magnetized characters are passed by the magnetic read head.
Figure 3B:
Figure 3C:
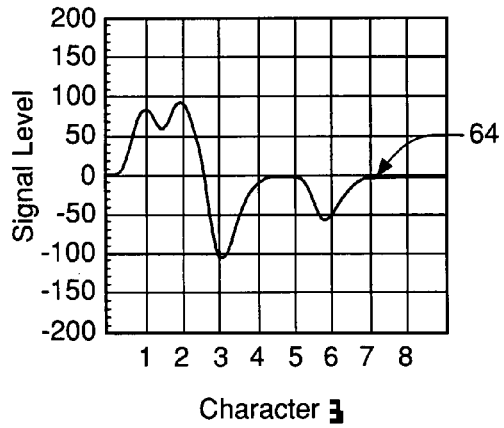
Figure 3D:
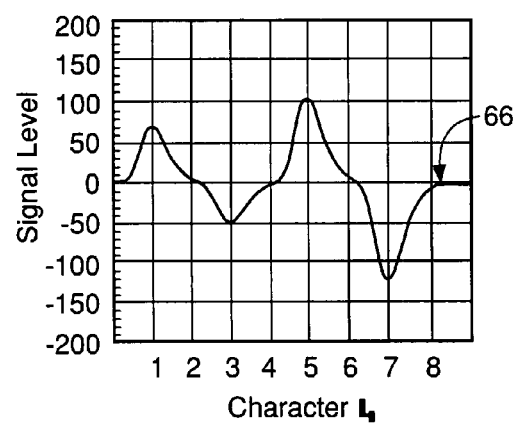
Figure 3E:
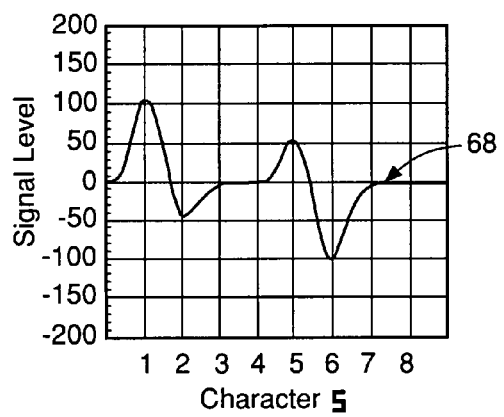
Figure 3F:
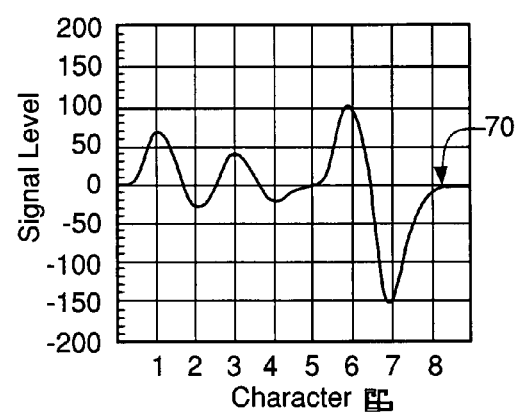
Figure 3G:
Figure 3H:
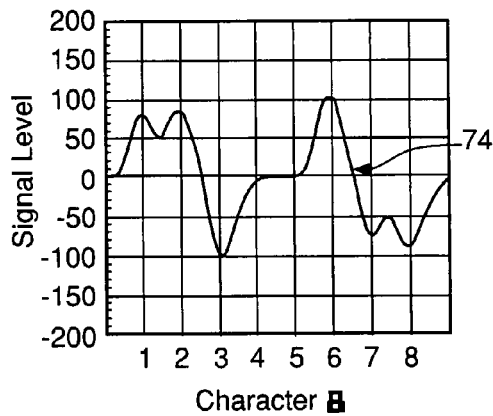
Figure 3I:
Figure 3J:
Figure 3K:
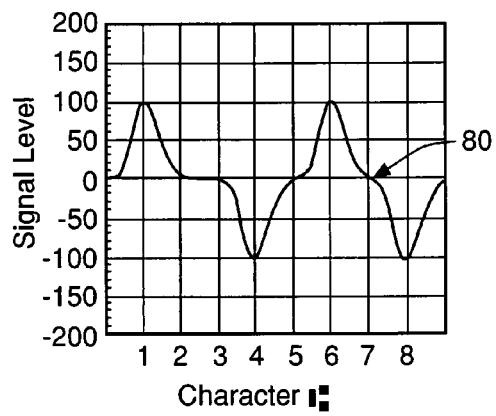
Figure 3L:
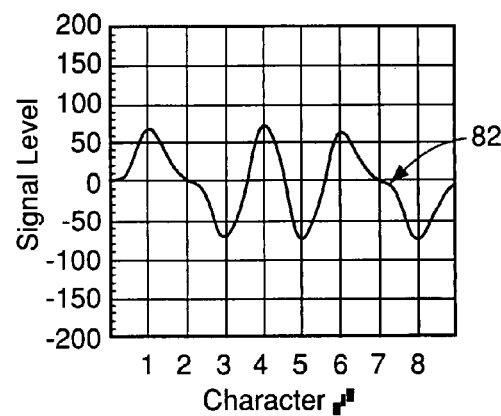
Figure 3M:
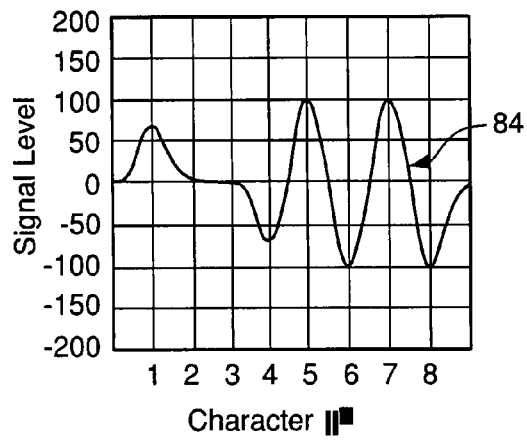
Figure 3N:
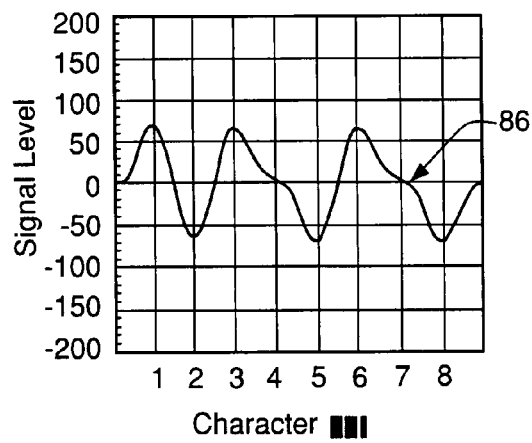

FIGS. 3A-3N demonstrate the waveform details of each of the characters/symbols shown in FIG. 2 when each character/symbol is moved past a single gap magnetic read head at a given constant velocity. FIG. 3A shows the waveform 60 for the character "1" as the character is moved past the read head. FIG. 3B shows the waveform 62 for the character "2" as the character is moved past the read head. FIG. 3C shows the waveform 64 for the character "3" as the character is moved past the read head. FIG. 3D shows the waveform 66 for the character "4" as the character is moved past the read head. FIG. 3E shows the waveform 68 for the character "5" as the character is moved past the read head. FIG. 3F shows the waveform 70 for the character "6" as the character is moved past the read head. FIG. 3G shows the waveform 72 for the character "7" as the character is moved past the read head. FIG. 3H shows the waveform 74 for the character "8" as the character is moved past the read head. FIG. 3I shows the waveform 76 for the character "9" as the character is moved past the read head. FIG. 3J shows the waveform 78 for the character "0" as the character is moved past the read head. FIG. 3K shows the waveform 80 for the symbol "R-T" as the symbol is moved past the read head. FIG. 3L shows the waveform 82 for the symbol "Amount" as the symbol is moved past the read head. FIG. 3M shows the waveform 84 for the symbol "On-Us" as the symbol is moved past the read head. FIG. 3N shows the waveform 86 for the symbol "Dash" as the symbol is moved past the read head.

In most applications, the characters are first magnetized prior to the characters being presented past the read heads. As shown, each unit on the x-axis represents 0.013 inches. The first character peak is aligned with the first position and the remaining peaks generally align with other vertical grid lines because the MICR characters/symbols are designed using increments of 0.013 inches in the horizontal direction. For those cases where the change in magnetic flux is not perfectly aligned, it is caused by the effects of the radii shifting the position of the maximum rate of change to the left.

Examples are the character "3", FIG. 2, with the six radii at the left of the character and the character "0", FIG. 2, with the large interior radii and large outside radii at the left hand stroke. The waveform 64 in FIG. 3C illustrates the fourth peak shift to the left for the character "3" and the waveform 78 in FIG. 3J shows the left shift of both peaks three and four for the character "0". Normally, in order to produce waveforms where the peaks correspond to known dimensions such as 0.013 inches, the velocity of the characters passing the read heads must be precisely set. Otherwise, the character peaks will be out of scale.

Figure 4:
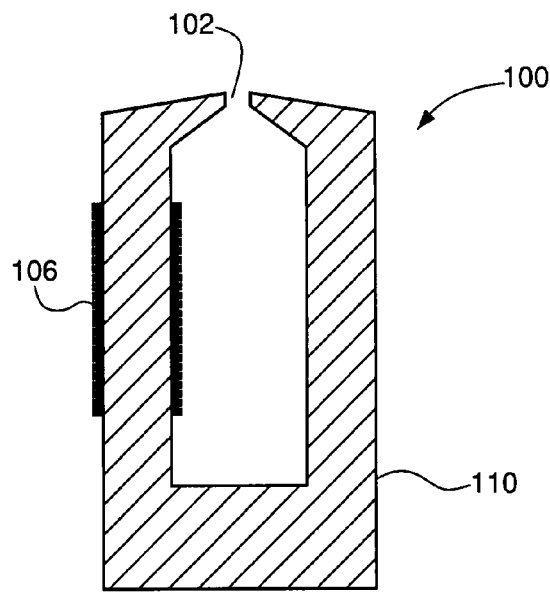
FIG. 4 is a cross-section view of a read head, which is one example of a suitable read head for reading magnetic ink characters.

In FIG. 4, a read head is generally indicated at 100, and includes a gap 102. The read head utilizes sensing coil 106. Core 110 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 5:
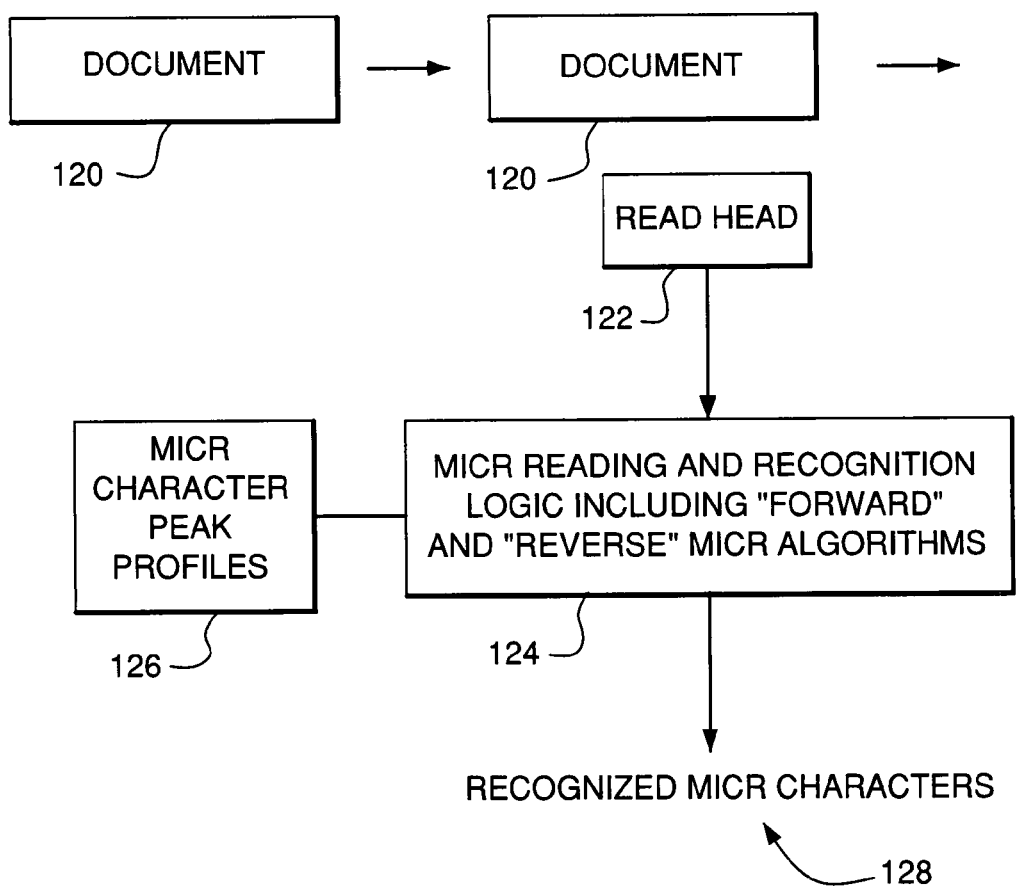
FIG. 5 is a block diagram illustrating a system for processing documents in a document reader/imager in accordance with the invention by reading character data printed in magnetic ink.

An exemplary embodiment of the invention is illustrated in FIGS. 5-8. FIG. 5 is a block diagram illustrating a system for processing documents in a document reader/imager in accordance with the invention by reading character data printed in magnetic ink. As shown, documents 120 are conveyed, one at a time, past the MICR read head 122. Block 124 represents the MICR reading and recognition logic. Logic 124 includes a traditional, "forward" MICR algorithm as understood by one of ordinary skill in the art.

In the traditional, "forward" MICR algorithm, the waveform obtained from the read head 122 is compared against known MICR character peak profiles 126 (FIGS. 3A-3N). If the recognition is successful, the MICR reading and recognition logic 124 determines the recognized MICR characters 128 and document processing for the document continues in a normal fashion, with the document being conveyed past any other processing devices on its way to an appropriate pocket or other processed document collection area.

In accordance with the invention, logic 124 further includes a "reverse" MICR algorithm that is utilized to process backwards documents to reduce the need for manual processing. More specifically, when a document/item that is being read by read head 122 and processed by reading and recognition logic 124 contains a high number of unknown characters as determined by the traditional, "forward" MICR algorithm, it is concluded that the document may be oriented backwards. In this case, the waveform obtained from the read head 122 is compared against patterns that are expected when the document is processed backwards. A backwards document will generate a waveform that is reversed and inverted. The waveform is reversed because the characters/symbols will be read in the reverse order as the document is conveyed past the read head because the document is backwards. Because the flux change when the leading edge of the character string reaches the read head is positive, the first sensed peak is always a positive peak. Accordingly, when the document is backwards, the waveform is inverted. In addition, the waveform will likely have reduced amplitude and signal quality due to the read head reading through the document because the magnetic ink is on the far side of the document due to the document being oriented backwards.

In the "reverse" MICR algorithm, the waveform obtained from the read head 122 is still compared against known MICR character peak profiles 126 (FIGS. 3A-3N); however, consideration is given to the fact that the waveform is reverse, inverted, and possibly has reduced amplitude and signal quality due to the document being backwards. If the recognition is successful, the MICR reading and recognition logic 124 determines the recognized MICR characters 128 and document processing for the document continues in a normal fashion (for a known backwards document), with the document being conveyed past any other processing devices on its way to an appropriate pocket or other processed document collection area. If the document is determined to be backwards, in a processing application where front and rear image cameras capture front and rear images of the document, the system may appropriately swap the images.

Figure 6:
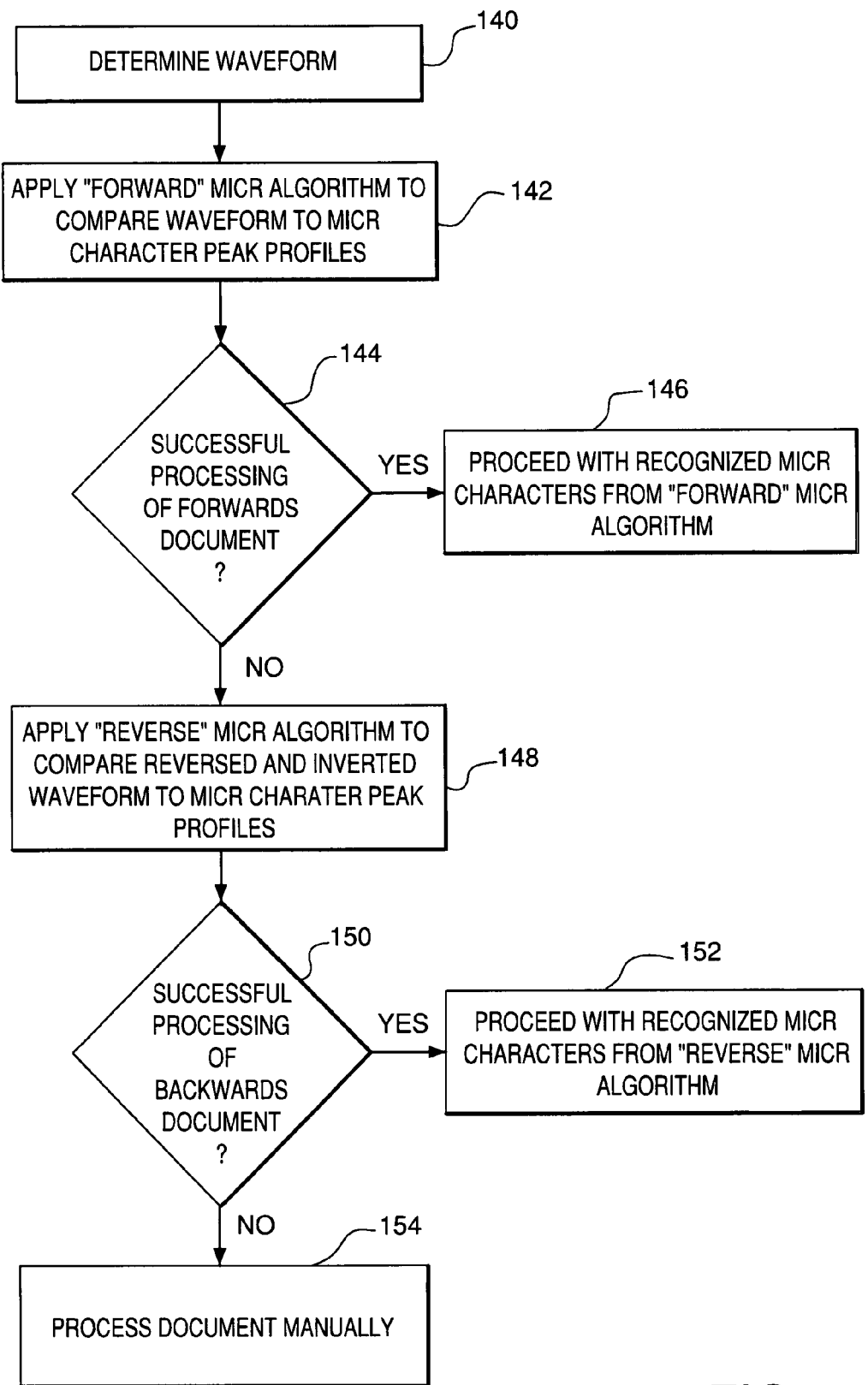
FIG. 6 is a flow chart illustrating a method for processing documents in a document reader/imager in accordance with the invention by reading characters printed in magnetic ink.

FIG. 6 is a flow chart illustrating a method for processing documents in a document reader/imager in accordance with the invention by reading characters printed in magnetic ink. At block 140, the waveform for the MICR character string is determined. At block 142, the traditional, "forward" MICR algorithm is applied to compare the waveform to the known MICR character peak profiles. According to decision block 144, if the document is successfully processed as a correctly oriented forwards document (as opposed to a backwards document), processing proceeds with the recognized characters from the "forward" MICR algorithm as indicated at block 146. In the case where reading and recognition with the traditional MICR algorithm are not successful due to a high number of unknown characters, it is concluded that the document may be oriented backwards.

At block 148, the "reverse" MICR algorithm is applied. The waveform is still compared against the known MICR character peak profiles, but the waveform is compared against patterns that would be expected when the document is processed backwards. Put another way, the backwards document produces a reversed and inverted waveform. This waveform may be corrected and then compared against the normal peak profiles, or the uncorrected waveform may be compared against a set of modified peak profiles. The particular details of the comparison may vary, with the important fact being that consideration is given to the fact that the original waveform is reversed, inverted, and possibly has reduced amplitude and signal quality due to the document being backwards.

According to decision block 150, if the document is successfully processed as a backwards document, processing proceeds with the recognized characters from the "reverse" MICR algorithm as indicated at block 152. In the case where reading and recognition with the "reverse" MICR algorithm are also not successful due to a high number of unknown characters, it cannot be concluded by the MICR algorithms whether the document is oriented forwards or oriented backwards. Appropriate steps should be taken such as manual intervention as indicated at block 154 or the document may be routed to a reject pocket.

FIG. 7 illustrates a waveform 170 for the magnetic ink character data string "54321" when the document containing the data is inserted correctly, in the forward direction, into the feeder of the document processor. The string on the document is "54321" but the waveform 170 actually shows "12345" because the MICR read head reads the document from right to left. When this same document is processed backwards, the waveform becomes reversed and inverted. FIG. 8 illustrates a waveform 180 for the magnetic ink character data string "54321" (the string on the document is "54321") when the document containing the data is inserted backwards, in the reverse direction, into the feeder of the document processor. As shown, waveform 180 is reversed with respect to waveform 170 because the characters/symbols are read in the reverse order due to the document being backwards. In addition, waveform 180 is inverted with respect to waveform 170 because, even though the document is backwards, when the edge of the character string reaches the read head, the first peak is positive due to the sensed increase in magnetic flux. Finally, waveform 180 has reduced amplitude with respect to waveform 170 due to the read head having to read through the document to read the characters when the document is backwards.

In accordance with the system and method described above, the processing of the waveform 180 in FIG. 8 using the traditional MICR algorithm results in a large number of unknown characters. In turn, processing waveform 180 with the reverse "MICR" algorithm properly recognizes the data string because consideration is given to the fact that the waveform is a reversed and inverted version of waveform 170 in FIG. 7.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for processing a document having a near side and a far side comprising the steps of:

imaging the near side of the document with a front imaging camera for creating a near side image of the document;
 imaging the far side of the document with a rear imaging camera for creating a far side image of the document;
 locating a read head proximate the near side of the document;
 utilizing the read head for sensing, through the document from the near side to the far side, magnetic ink disposed upon the far side of the document for producing a magnetic ink character data string waveform;
 analyzing the magnetic ink character data string waveform by applying magnetic ink character recognition logic including a reverse magnetic ink character recognition algorithm, wherein the reverse magnetic ink character recognition algorithm includes the steps of determining that the magnetic ink character data string waveform is reversed, determining that the magnetic ink character data string waveform is inverted, and determining that the magnetic ink character data string waveform includes a reduced amplitude for analytically recognizing that the document is arranged in a backward orientation relative the read head for permitting continued processing of the backward and inverted document; and swapping the far and near side images with one another in order to compensate for the analytically recognized backward orientation of the document as a result of the determination that the magnetic ink character data string waveform is: reversed, inverted and includes a reduced amplitude.

2. The method of claim 1 wherein the reverse magnetic ink character recognition algorithm further includes the step of determining that the magnetic ink character data string waveform includes a reduced signal quality.

3. The method of claim 1 further comprising processing the document manually, wherein processing the document manually comprises:

prior to the permitting step, whereupon the magnetic ink character data string waveform is not analytically recognized as being arranged in the backward orientation relative the read head, the step of routing the document to a reject pocket and bypassing the permitting and swapping steps.

4. A system for processing a document having a near side and a far side, comprising:

a feeder portion including a primary feeder and a secondary feeder;

a transporting portion connected to the feeder portion, wherein the transporting portion includes a magnetic ink character recognition reader and an optical character recognition reader, wherein both of the magnetic ink character recognition reader and the optical character recognition reader are in communication with the secondary feeder, wherein the magnetic ink character recognition reader includes a read head including a sensing coil disposed about a core portion, wherein the transporting portion further comprises upstream imaging devices, wherein the upstream imaging devices includes a front imaging camera providing means for imaging the near side of the document for creating a near side image of the document and a rear imaging camera providing means for imaging the far side of the document for creating a far side image of the document; and magnetic ink character recognition logic in communication with the read head, wherein the magnetic ink character recognition logic includes a reverse magnetic ink character recognition algorithm that provides means for analyzing the magnetic ink character data string waveform by: determining that the magnetic ink character data string waveform is reversed, determining that the magnetic ink character data string waveform is inverted, and determining that the magnetic ink character data string waveform includes a reduced amplitude for analytically recognizing that the document is arranged in a backward orientation relative the read head for permitting continued processing of the backward and inverted document and swapping the far and near side images with one another in order to compensate for the analytically recognized backward orientation of the document as a result of the determination that: the magnetic ink character data string waveform is reversed, inverted and includes a reduced amplitude.

5. The system of claim 4 wherein the transporting portion further comprises:

an operator display in communication with the magnetic ink character recognition reader and the optical character recognition reader, a post-read view station in communication with the operator display, a low-speed document encoder in communication with the post-read view station, a multi-jet endorser in communication with the low-speed document encoder, a full-field high-speed encoder in communication with the a multi-jet endorser, a downstream imager in communication with the full field speed encoder, and a stacker module in communication with the downstream imager.

* * * * *

UNITED STATES PATENT AND TRADEMARK OFFICE
CERTIFICATE OF CORRECTION

PATENT NO. : 8,023,717 B1
APPLICATION NO. : 11/653561
DATED : September 20, 2011
INVENTOR(S) : John Gudenburr et al.

It is certified that error appears in the above-identified patent and that said Letters Patent is hereby corrected as shown below:

In the Abstract, item (57);

On the Title page of the Patent, line number 14, after the word passing, delete the word "though" and insert the word -- through --.

In the Claims:

At column 8, claim number 5, line number 38, delete the word "a".

Signed and Sealed this
Twentieth Day of March, 2012

David J. Kappos
*Director of the United States Patent and Trademark Office*